(12) United States Patent
Lagali et al.

(10) Patent No.: US 6,292,597 B1
(45) Date of Patent: Sep. 18, 2001

(54) N×N NON-BLOCKING OPTICAL SWITCH

(75) Inventors: Neil S. Lagali, Brantford; Ian MacDonald, Manotick; Reza Paiam, Ottawa, all of (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/227,857

(22) Filed: Jan. 11, 1999

(51) Int. Cl.[7] ................................. G02F 1/01; G02B 6/26
(52) U.S. Cl. .................................................. 385/1; 385/17
(58) Field of Search .............................. 385/1, 3, 17, 24, 385/39

(56) References Cited

U.S. PATENT DOCUMENTS

| 5,933,554 | * | 8/1999 | Leuthold et al. | 385/28 |
| 6,084,992 | * | 7/2000 | Weber et al. | 385/24 |
| 6,169,824 | * | 1/2001 | Sigogne et al. | 385/3 |

OTHER PUBLICATIONS

General self–imaging properties in N×N multimode interference couplers including phase relations; M. Bachmann; P.A.Besse, H.Melchior Applied Optics, vol. 33, No. 18 Jun. 20, 1994. pp. 3905–3911.

Overlapping–image multimode interference couplers with a reduced number of self–images for uniform and nonuniform power splitting M. Bachmann; P.A.Besse; H.Melchior Applied Optics, vol. 34, No. 30, Oct. 20, 1995. pp. 6898–6910.

Compact Polarization–insensitive multi–leg 1×4 mach–zehnder switch in InGaAsP/Inp M.Bachmann; Ch.Nadler; P.A.Besse; H.Melchior Proc. ECIO,Firenze, Italy, 1994. pp. 519–522.

Optical Multi–Mode Interference Devices Based on Self–Imaging: Principles and Applications L.B.Soldan; Erik C.M.Pennings J. Lightwave Technology, vol. 13, No. 4. Apr. 1995. pp. 615–627.

Novel 1×N and N×N Integrated optical switches using self–imaging multimode GaAs/AlGaAs waveguides R.M. Jenkins; J.M.Heaton; D.R.Wight; J.T. Parker; J.C.H.Birbeck; G.W. Smith; K.P. Hilton Appl. Phys.Lett. vol. 64, No. 6. Feb. 7, 1994. pp. 684–686.

The integrated prism interpretation of multileg Mach–Zehnder interferometers based on multimode interference couplers Ins. Quantum Electronics, vol. 27. 1995. pp. 900–920.

New 2×2 and 1×3 Multimode Interference Couplers with Free Selection of Power Splitting Ratios Journal of Lightwave Technology, vol. 14, No. 10, Oct. 1996. pp. 2286–2293.

Arbitrary ratio power splitters using silica angled on silicon multimode interference couplers Electronics Letters, vol. 32, No. 17. Aug. 15, 1996. pp. 1576–1577.

* cited by examiner

Primary Examiner—Frank G. Font
Assistant Examiner—Layla Lauchman
(74) Attorney, Agent, or Firm—Neil Teitelbaum

(57) ABSTRACT

Combinations of optically coupled Generalized Mach-Zehnder Interferometers (GMZIs) result in switches of greater switching capacity than an isolated GMZI. In a preferred form, the present invention provides a balanced non-blocking switch by using symmetrical configurations of optically coupled GMZIs, and also provides a cascaded non-blocking switch by cascading an N×N GMZI with a (N−1)×(N−1) non-blocking switch.

24 Claims, 4 Drawing Sheets

N×N NON-BLOCKING OPTICAL SWITCH

FIELD OF THE INVENTION

This invention relates generally to optical communication systems and the like. In particular, the present invention relates to optical switches having a greater number of switching states than a conventional Generalized Mach-Zehnder interferometer (GMZI). One embodiment of this invention relates to an N×N non-blocking optical switch.

BACKGROUND OF THE INVENTION

As we move towards the realization of widespread fiber optic networks, it is becoming increasingly important to provide optical switching at the optical network nodes. Optical switching is expected to become increasingly important as wavelength division multiplexing expands the number of optical paths available. By using integrated optical components to perform network node routing functions, advantages in terms of functionality, size, speed, and efficiency are achievable.

The integrated optical multimode interference (MMI) coupler has been the subject of much attention and research in recent years, see for example: L. B. Soldano, et al. in a paper entitled "Planar Monomode Optical Couplers Based on Multimode Interference Effects," *J Lightwave Technol.*, vol. 10, no. 12, pp. 1843–1849, 1992; M. Bachmann, et al. in a paper entitled "General self-imaging properties in N×N multimode interference couplers including phase relations," *Appl. Opt.*, vol. 33, no. 18, pp. 3905–3911, 1994; and L. B. Soldano et al., in a paper entitled "Optical multi-mode interference devices based on self-imaging: principles and applications," *J Lightwave Technol.*, vol. 13, no. 4, pp. 615–627, April 1995. All references in this document are herein incorporated by reference. This passive device has been shown to possess a host of desirable qualities such as low excess loss, small size, fabrication tolerant behavior, and relative polarization and wavelength insensitivity. It has also been shown that MMI couplers can be used in a generalized Mach-Zehnder interferometer (GMZI) configuration to actively route and switch optical signals, as detailed by: L. B. Soldano et al., in a paper entitled "Optical multi-mode interference devices based on self-imaging: principles and applications," *J Lightwave Technol.*, vol. 13, no. 4, pp. 615–627, April 1995; and R. M. Jenkins, et al., in a paper entitled "Novel 1×N and N×N integrated optical switches using self-imaging multimode GaAs/AlGaAs waveguides," *Appl. Phys. Lett.*, vol. 64, no. 6, pp. 684–686, February 1994.

An N×N GMZI has a limited switching capacity. The N×N GMZI has N possible switching states. In view of this, there are many desired switching states that are not accessible. Indeed, once a route has been chosen for light launched into a particular input port of the N×N GMZI to emerge from a selected output port, routes for light launched into all remaining input ports are fixed. For example, if light is switched from a first input port to a fourth output port in a 4×4 GMZI, light can only be switched from: a second input port to a second output port; a third input port to a third output port; and a fourth input port to a first output port. This demonstrates blocking switching capacity provided by an isolated N×N GMZI. 15 Switches have been proposed that use a plurality of Mach-Zehnder interferometers, see, for example, M. Bachmann, et al., "Compact Polarization-Insensitive Multi-Leg 1×4 Mach-Zehnder Switch in InGaAsP/InP," in *Proc.* ECIO, Firenze, Italy, pp. 519–522, 1994, in which a number of independently controlled 1×N GMZI switches are used. While this design is a strictly non-blocking optical switch, it requires 4N MMI couplers, $2N^2$ phase shifters, and numerous waveguide crossings, resulting in a large and complex switch with complicated control requirements. The waveguide crossings have specific geometrical tolerances that have to be met. If the specific geometrical tolerances are not met, "cross-talk" increases substantially and often increases attenuation. Control of a 4×4 switch using Bachmann's design requires 16 MMIs and 32 phase shifters. It will be appreciated by one skilled in the art that both manufacture and control of such a device is not a simple matter.

There is a need for reliable switches that are not overly complicated to manufacture and operate.

OBJECT OF INVENTION

Thus, in an attempt to overcome limitations of known prior art devices, it is an object of this invention to provide a new N×N optical switch.

SUMMARY OF THE INVENTION

A new generation of optical switches is provided. The optical switches provide any switch states. A switch state is a specific series of routing connections formed by outing light from one set of ports to another set of ports in a particular optical switch.

The terms input port and output port are used primarily to define structure. Non-blocking optical switches commonly function in reverse and those described herein are no exception. The terms output port and input port do not signify any restriction in direction of light flow in the optical switches of the present invention. For any singular switch state, if a beam of light is launched into an input port to emerge from a particular output port, a beam of light when launched into the output port will emerge from the input port. The optical switches defined in this document function in both routing directions. However, a particular direction of flow may be preferred for some switching applications. Obviously, the devices disclosed are able to be made uni-directional such that they operate in one or the other direction of flow by incorporation of other components. As used herein, each of the terms "first ports" and "second ports" refers to either input ports or output ports or input/output ports.

As used herein, the expression "non-blocking optical switch" refers to a "wide sense non-blocking optical switch" which describes a device with input ports and output ports. A signal from any input port is routed to any unoccupied output port. A new path is provided from any input port to any output port; however, to provide the new path, existing connections of the optical switch are disrupted. A "wide sense non-blocking optical switch" is distinct from a "strictly non-blocking optical switch". A "strictly non-blocking optical switch" describes a device with input ports and output ports. In a "strictly non-blocking optical switch" a signal from any input port is capable of being routed to any unoccupied output port, and the new path is capable of being provided from any input port to any output port without disrupting existing connections other than those necessary to make the change.

The terms "power" and "intensity" as used herein are interchangeable as one killed in the art will appreciate power is time dependent intensity.

In accordance with the invention there is provided an optical switch comprising: n integrated optical N×N Mach-Zehnder interferometer, N being greater than 2, the integrated optical Mach-Zehnder interferometer comprising a first N×N multimode interference coupler having N first ports and N second waveguides, and a second N×N multimode interference coupler having N first waveguides and N second ports, wherein N second waveguides of the first N×N multimode interference coupler are optically coupled with N first waveguides of the second N×N multimode interference coupler thereby forming N waveguide arms; optical path length changers for changing an optical path length of at least 2 of the N waveguide arms; and a P×P optical switch having P second ports and P first ports, where P is at least 2 and less than N, at least 2 of the P second ports optically coupled to at least 2 of the N first ports.

In a preferred embodiment of the optical switch N is greater than 3 and the switch comprises a U×U optical switch having U second ports and U first ports, where U is at least 2 and less than N, at least 2 of the U second ports optically coupled to at least 2 of the N first ports. In another preferred embodiment the optical switch further comprises a T×T optical switch having T second ports and T first ports, where T is at least 2 and less than N, and at least 2 of the T first ports optically coupled to at least 2 of the N second ports. In an even further embodiment the optical switch additionally comprises a Z×Z optical switch having Z second ports and Z first ports, where Z is at least 2 and less than N, at least 2 of the Z first ports optically coupled to at least 2 of the N second ports.

In other preferred embodiments: P+U=N;P+U=N=Z+T; P+U=N=Z+T; and N is selected from 4, 6, 8, 10 and 12.

In accordance with the invention there is further provided an optical switch comprising: a splitting region for splitting input light into N sub-beams, the splitting region having N first ports; a combining region having N second ports, the combining region for combining the N sub-beams and for providing the combined sub-beams to at least one of the N second ports; N waveguide arms coupling the splitting region to the combining region for providing the N sub-beams from the splitting region to the combining region, where N is even and greater than 3; optical path length changers for changing an optical path length of at least (N−1) of the N waveguide arms; a P×P non-blocking optical switch having P second ports and P first ports, P is at least 2 and less than N, and at least 2 of the P second ports optically coupled to at least 2 of the N first ports; a U×U non-blocking optical switch having U second ports and U first ports, U being N−P, at least 2 of the U second ports optically coupled to at least 2 of the N first ports; a T×T non-blocking optical switch having T second ports and T first ports, T is at least 2 and less than N, and at least 2 of the T first ports optically coupled to at least 2 of the N second ports; a Z×Z non-blocking optical switch having Z second ports and Z first ports, where Z is N−T, at least 2 of the Z first ports optically coupled to at least 2 of the N second; and a controller for monitoring intensity of a beam of light emerging from a port of the optical switch and for providing a signal to the optical path length changers, wherein the optical path length changers are for changing the optical path length of at least one waveguide arm of the internal waveguide arms in dependence upon the signal, the change for maintaining a switch state.

In accordance with the invention there is further provided a method of extending an (N−1)×(N−1) non-blocking optical switch which comprises a step of optically coupling N−1 second ports of an integrated optical N×N Mach-Zehnder interferometer to N−1 first ports of a (N−1)×(N−1) non-blocking optical switch.

In many instances, monitoring of a beam of light emerging from the optical switch is required. A small fraction, or tap, of optical power distributed to a specified port is used to monitor and ensure a specified intensity or integrity, i.e., switch state.

Under some circumstances a GMZI may drift- the specified intensity or integrity may change under a specific operational condition. The integrity of a beam of light may be compromised by contamination from other light beams giving rise to "cross-talk". If "cross-talk" becomes unacceptable a particular switch state may be reset to reduce "cross-talk". A controller is used for monitoring intensity of the beam of light emerging from the optical switch and for providing a feedback signal to the phase shifters. This feedback signal is for changing the optical path length of at least one waveguide arm of the optical switch, the change for maintaining a particular switch state.

BRIEF DESCRIPTION OF THE DRAWINGS

Exemplary embodiments of the invention will now be described in conjunction with the following drawings, in which.

In the following detailed description of the invention, the same numbering is used in different figures to designate similar components.

DETAILED DESCRIPTION OF THE PREFERRED EMBODIMENTS OF THE INVENTION

Expanded Capacity Switching and N×N Non-blocking Switching

Figure 1:
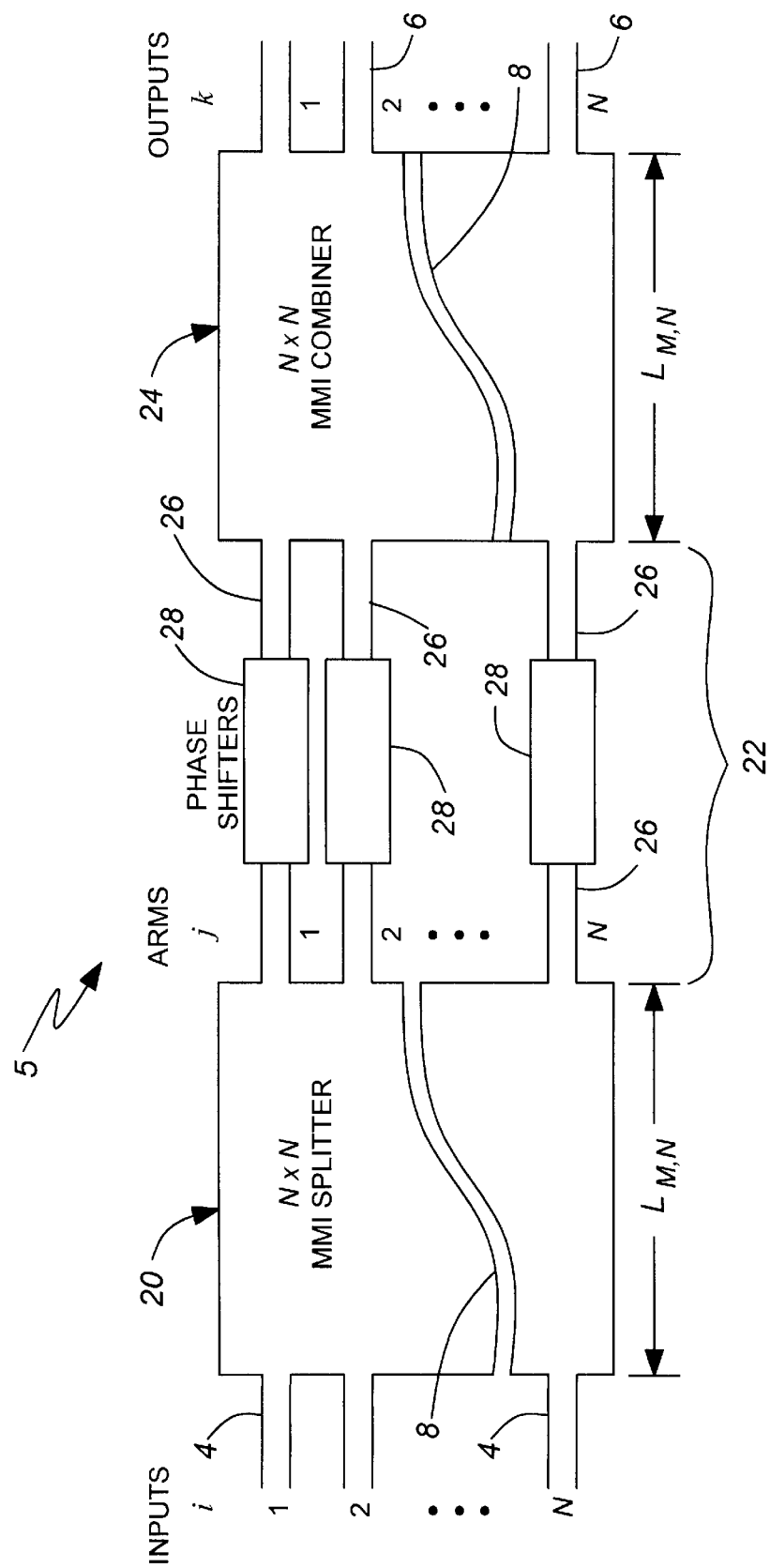
FIG. 1 is a schematic illustration of a general layout of an N×N generalized Mach-Zehnder interferometer. Identical N×N MMI couplers are used as splitter and combiner. Waveguide arms j are of the same length and have active phase shifting regions indicated by the shaded areas.

Referring to FIG. 1, the basic layout of an N×N GMZI 5 consists of three components: an N×N MMI splitter 20; an active phase shifting region 22 having N optical path length changers in the form of phase shifters 28 in the active phase shifting region 22; and an N×N MMI combiner 24. The MMI splitter 20 is illustrated as a substantially rectangular body; one side of the rectangular body having input ports 4 and the opposing side of the rectangular body having output waveguides. The MMI combiner 24 is illustrated as a substantially rectangular body, one side of the rectangular body having output ports 6 and the opposing side having input waveguides. In the N×N GMZI 5, the output waveguides of the N×N MMI splitter 20 and the input waveguides of the N×N MMI combiner 24 are coupled and form waveguide arms 26 between the N×N MMI splitter 20 and the N×N MMI combiner 24. Commonly, the waveguide arms are same waveguide arms absent any coupling therebetween. The waveguide arms 26 are shown as having substantially equal lengths. The N waveguide arms 26 are shown numbered sequentially from top to bottom, 1 to N. According to the embodiment described herein, the waveguide arms 26 are disposed along a straight path.

Phase shifters 28 are shown intimate with the waveguide arms 26. An individual phase shifter 28 is shown associated with a single waveguide arm. The phase shifters 28 when not active provide a passive device. An active phase shifter 28 changes an optical path length of its associated waveguide arm 26. The bodies of the MMI splitter 20 and the N×N MMI combiner 24 are illustrated as having a break line 8. The break line 8 is used to indicate that the number N of corresponding input ports 4 and output ports 6 varies according to design requirements.

Phase shifting is well known. For example, changing an optical path length of a light medium can perturb the phase of a beam of light passing through the medium. Many phase shifting effects may be exploited in the design of GMZIs, for example, temperature, electro-optic effects, and stress within a medium; information pertaining to phase shifting effects is presented in Nishihara, et al. in "Optical Integrated Circuits". New York: McGraw-Hill, 1989, ch. 5. Commonly, a heater electrode deposited on top of a waveguide arm 26 is used to heat the waveguide arm 26 thereby providing a thermally induced phase shift.

An optical field at any of the input ports 4 of the MMI splitter 20 is reproduced at all output ports of the splitter resulting in an equal distribution of light power to all waveguide arms 26 of the active phase shifting region 22. These distributions of the light have equal intensity, but different phase.

The function of the phase shifters 28 is to modify the phase of one or more of the distributions such that a specific distribution of relative phases is obtained at the input ports to the MMI combiner 24. The phase shifters 28 are indicated in the figures by shaded regions on the waveguide arms 26. One of the phase shifters 28 is operated by applying a driving signal in the form of a voltage or current, for example, to shift the phase of the light in one of the waveguide arms 26 by virtue of any of a number of effects, such as the electro-optic or the thermo-optic effect.

The MMI combiner 24 performs the function of combining light from N input waveguides of the combiner to form combined light signals at the output ports 6 thereof. The positions and intensities of the combined light signals depend upon relative phases of light signals at the input waveguides of the MMI combiner 24. Since the phase shifters 28 control the relative phases incident on the input waveguides of the combiner 24, control of the positions and intensities is performed by activating the phase shifters 28 to achieve a required phase distribution at the combiner input waveguides.

The N×N GMZI 5 is capable of variably routing beams of light provided to each of a plurality of input ports to a plurality of output ports. However, N switch states of the N×N GMZI 5 allow only N possible variations of said routing. In contrast, a non-blocking optical switch architecture is capable of providing N factorial variations, an entire set, of routing of beams of light provided to the input ports to the output ports.

The switching capacity of the N×N GMZI 5 is increased by optically coupling at least two input ports 4 of the N×N GMZI 5 to an optical switch, for example, an N−1)×(N−1) optical switch. An example of an expanded capacity optical switch is a 4×4 GMZI having two ports thereon optically coupled to two ports of a 2×2 GMZI.

According to a further embodiment, GMZIs of different dimensions are used to achieve an N×N non-blocking optical switch. Below, two embodiments of non-blocking optical switches according to the invention are described: (i) a cascaded design; and (ii) a balanced design.

Cascaded Design The simplest GMZI is a 2×2 optical switch, which is non-blocking. The switch has two input ports and two output ports and light can be routed from either input port to either output port. The possible routings are referred to herein as light routing permutations. Both light-routing permutations are possible for the 2×2 optical switch, and the light routing permutations are controlled by a single phase shift of magnitude $\pi$ in either waveguide arm 26.

To create a 3×3 non-blocking optical switch six light routing permutations are required. The six light routing permutations are listed in the first column of Table 1. The first column of Table 1 lists output light routing permutations for non-blocking operation, and the second column lists light routing permutations available from a 3×3 GMZI. The first two rows of the first column are described as follows. The first row of the first column of Table 1 describes: a beam of light being routed from an input port number 1 to an output port number 1, i.e., (1,1); a beam of light being routed from an input port number 2 to an output port number 2, i.e., (2,2); and a beam of light being routed from an input port number 3 to an output port number 3, i.e., (3,3). The second row of the first column of Table 1 describes: (1,1); (2,3); and (3,2). The remaining rows and columns are understood from the preceding description by one of skill in the art.

It is evident from Table 1 that the light routing permutations are divided into three sets of two light routing permutations, with routing from one input port kept constant in each set. The remaining two ports are arranged either in ascending or descending order.

The 3×3 GMZI is capable of only three distinct light routing permutations, listed in the second column of Table 1, namely: [(1,1), (2,3), (3,2)]; [(1,2), (2,1), (3,3)]; and [(1,3), (2,2), (3,1)]. Each of these three light routing permutations corresponds to a single member from each of the three sets in the first column. A further capability of switching light from two latter output ports of the GMZI from ascending to descending order, and vice-versa, to obtain the entire set of six light routing permutations is advantageous. As noted above, a 2×2 GMZI is capable of providing the function of switching light from each of two input ports of the GMZI to each of two output ports thereof. In one embodiment, the 3×3 non-blocking optical switch is therefore realized using a 3×3 GMZI with two output ports optically coupled to a 2×2 GMZI. Preferably the ports are adjacent ports.

The same approach is used to create larger non-blocking optical switches. For instance, in a 4×4 non-blocking optical switch, 24 light routing permutations are required. A 4×4 GMZI has four light routing permutations, and a 3×3 non-blocking optical switch connected to three of the four GMZI output ports provides at least six light routing permutations for each of the four GMZI light routing permutations. In this manner, the 4×4 non-blocking optical switch is realized by cascading a 4×4 GMZI, a 3×3 GMZI, and a 2×2 GMZI. In general, N−1 cascaded GMZIs form an N×N non-blocking optical switch as shown in FIG. 2.

Figure 2:
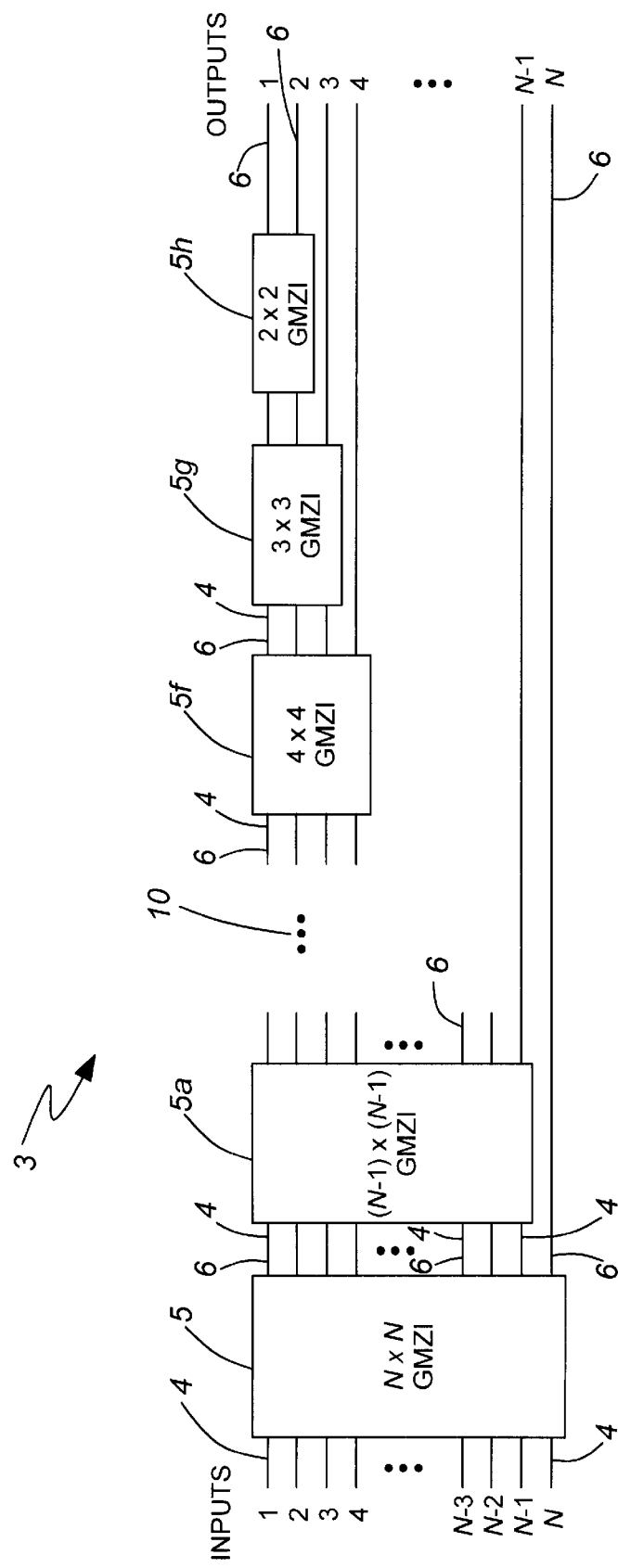
FIG. 2 is a schematic illustration of a general layout of the N×N cascaded non-blocking optical switch. The optical switch is composed of smaller GMZIs, arranged in descending order.

Referring to FIG. 2, a generic cascaded configuration of the cascaded N×N non-blocking optical switch 3 is shown. An N×N GMZI 5 has 1 to (N−1) output ports 6 optically coupled to 1 to (N−1) input ports 4 of an (N−1)×(N−1) GMZI 5a. The cascaded non-blocking switch is illustrated with a break in structure 10 from the (N−1)×(N−1) GMZI 5a to a 4×4 GMZI 5f. The break in structure 10 from the (N−1)×N−1) GMZI 5a is used to indicate that the number of cascaded GMZIs varies according to design requirements. The cascaded non-blocking optical switch 3 terminates with the first three output ports 6 of a 4×4 GMZI 5f optically coupled to three input ports 4 of a 3×3 GMZI 5g, and the first two output ports 6 of a 3×3 GMZI 5g optically coupled to two input ports of a 2×2 GMZI 5h. The N×N GMZI 5 is upstream. Alternatively, the 2×2 GMZI 5h is upstream. Further alternatively, both are upstream and downstream when light propagates bi-directionally.

If the N×N GMZI 5 is removed from the N×N non-blocking optical switch 3 an N−1×(N−1) non-blocking optical switch remains. The (N−1)×(N−1) non-blocking optical switch comprises N−2 GMZI's each having a different number of waveguide arms, the number of waveguide arms ranging from 2 to N−1, where the N−2 GMZI's are arranged in descending order by the number of waveguide arms, such that each GMZI other than a terminal GMZI with 2 waveguide arms 5h and an initial GMZI with N−1 waveguide arms 5a is disposed between two GMZI's—one with one more waveguide arm and one with one less waveguide arm—each GMZI having a single free output port and each port other than the free output port within a GMZI optically coupled to one and only one port of an adjacent GMZI. Of course, it is possible to rearrange the GMZI order so long as the available permutations provide for non-blocking operation.

For a desired light routing permutation from the N×N non-blocking optical switch 3, consider first a beam of light launched into an input port 4 to be routed to an N-th output port 6, and configure the N×N GMZI 5 such that the beam of light launched into input port 4 emerges from the N-th position of the output port 6 of the N×N GMZI 5. Secondly, consider a beam of light launched into another input port 4 to be routed to an (N−1)-th output port 6, and configure the (N−1)×N−1) GMZI 5a such that light from this input port emerges from the (N−1)-th position the output port of the (N−1)×(N−1) GMZI 5a, and so forth. Alternatively, other orderings of the (N−2) GMZI's result in a similar benefit. For example, a 4×4, a 2×2, and a 3×3 all in that order provide a 4×4 non-blocking switch.

In addition, each light routing permutation corresponds to a unique state of the optical switch providing an efficient design. Conversely, the number of possible switch states is equal to the number of possible light routing permutations, which ensures that there is no redundancy in the design. This permits use of a small number of MMI couplers, phase shifters, and waveguide crossings to achieve N factorial light routing permutations. Specifically, (2N−2) MMI couplers, $(N^2+N-2)/2$ phase shifters, and zero waveguide crossings are required.

Attenuations resulting from paths traversed by optical signals in the cascaded design are not identical. A signal emerging from the N-th output has traversed two MMI couplers, while the signal emerging from the (N−1)-th output port has traversed four MMI couplers, while the signal emerging from the first output port has traversed all (2N−2) MMI couplers. Since each MMI coupler has a finite excess loss, a signal emerging from the N-th output port is the least attenuated, while a signal emerging from the first output port is the most attenuated. To overcome an imbalance of attenuation, beams of light emerging from the output ports are attenuated and/or amplified such that the beams of light are of similar intensity.

Balanced Design for Even Values of N

Another approach to balancing N×N non-blocking optical switches is by optically coupling smaller optical switches to each of the input ports 4 and the output ports 6 of an N×N GMZI 5. As is evident, additional light routing permutations necessary for non-blocking operation are achieved whilst maintaining a symmetric balanced design.

Figure 3:
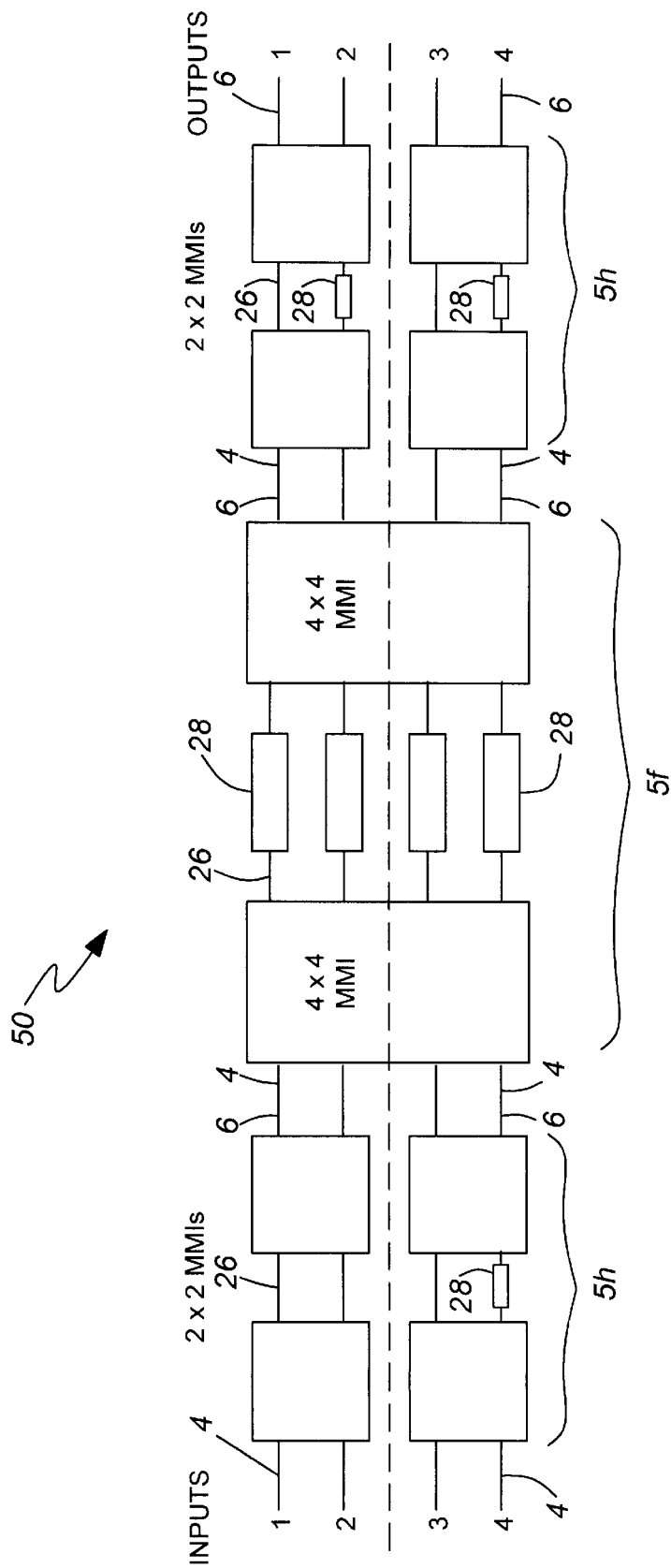
FIG. 3 is a schematic illustration of a 4×4 balanced non-blocking optical switch. The shaded regions indicate phase shifters. Three active 2×2 GMZIs allow 4·2³=32 output permutations to be achieved, with redundancy. Location of a passive 2×2 GMZI is chosen arbitrarily.

Referring to FIG. 3, the basic layout of a balanced 4×4 non-blocking optical switch 50 is formed from a 4×4 GMZI 5f and four 2×2 GMZIs 5h. The 4×4 GMZI 5f is constructed in a similar manner as described in FIG. 1, in which N=4. The 4×4 GMZI 5f is shown having four input ports 4 and four output ports 6. The 2×2 GMZIs 5h are also constructed in a similar manner as described in FIG. 1, in which N=2, however the 2×2 GMZIs 5h only require one waveguide arm 26 to have a phase shifter in order to function as optical switches. Hence, a 2×2 GMZI 5h is capable of accessing all of its switch states with only a single phase shifter 28. The first and second input ports 4 of the 4×4 GMZI are optically coupled to two output ports 6 of a first 2×2 GMZI 5h. The second and third input ports 4 of the 4×4 GMZI 5f are optically coupled to two output ports 6 of a second 2×2 GMZI 5h. The first and second output ports 6 of the 4×4 GMZI 5f are optically coupled to two input ports 6 of a third 2×2 GMZI. The third and fourth output ports 6 of the 4×4 GMZI 5f are optically coupled to two input ports 6 of a fourth 2×2 GMZI. Preferably, the balanced 4×4 non-blocking switch is constructed such that no waveguide paths cross.

Three active 2×2 GMZIs 5h allow $4 \cdot 2^3 = 32$ light routing permutations to be achieved, with redundancy. Therefore, a passive 2×2 GMZI may be used in place of one of the four 2×2 GMZI's. The position of the passive 2×2 GMZI may be is chosen arbitrarily. The 4×4 non-blocking optical switch 50 is balanced, since each path from an input port to an output port traverses two 4×4 MMIs and four 2×2 MMIs. Also, non-blocking blocking operation is achieved. Within a resulting 32 light routing permutations are the threshold 24 unique light routing permutations required for a 4×4 optical switch to operate as a non-blocking optical switch. Some of the 32 light routing permutations are redundant.

In this design both balanced and non-blocking operation are achieved, but with the tradeoff that the configuration of the optical switch is more complex. In the balanced 4×4 non-blocking optical switch 50, the 32 possible light routing permutations are not unique so in some instances different switch configurations are used to achieve a given permutation. Consequently, there are numerous ways to achieve some of the 24 light routing permutations required for the balanced 4×4 non-blocking optical switch 50. In some instances, determination of the GMZI states to achieve a given permutation are more complex than for the cascaded design. Of course, when a look up table is used for storing the GMZI states, there is no additional complexity.

A set of cross-connects (i, k) for the 4×4 GMZI 5f is shown in Table 2. A onfiguration state of the GMZI corresponds to a single row. An imaginary bisection line dashed line) drawn in FIG. 3 splits the N×N GMZI. This is indicated in Table 2 by a dashed line. The set of all possible crossovers of the input ports i from one side of the bisection line to the output ports k on the other side is obtained within the four GMZI states. Hence, non-blocking operation is possible using a 4×4 GMZI 5f. In FIG. 3, consider an imaginary line that bisects the optical switch symmetrically along its path. This line bisects the 4×4 GMZI 5f, but does not cross any of the other components. In Table 2, this bisection of the 4×4 GMZI 5f is represented by shading the inputs on the top and bottom portions of the GMZI differently. For non-blocking operation, the optical switch must be capable of routing light launched into any possible number of input ports from the top half of the optical switch to the same number of output ports from the bottom half, and vice-versa. This is because the 4×4 GMZI 5f is the only region in the optical switch where light launched into input ports within the top half of the optical switch is capable of being routed to the bottom half of optical switch, and vice-versa. The 2×2 GMZIs 5h are confined to routing light within either the top or bottom half of the device, and therefore cannot perform this "crossover" function. In this example, the 4×4 GMZI 5f is capable of 0, 1, and 2 crossovers of input signals from the top half to output ports in the bottom half, and vice-versa It is this property of the 4×4 GMZI 5f, which results in non-blocking operation of the 4×4 optical switch 50.

To configure the balanced 4×4 non-blocking optical switch 50, first consider the light routing permutation to determine how many crossovers of the bisection line are necessary. Second, set the 4×4 GMZI 5f to the corresponding state, determined from Table 2. Third, the 2×2 GMZIs are each set in either the bar or cross state to achieve the desired permutation. In this manner, a control table for the 4×4 optical switch is derived. One possible set of control states for the 4×4 balanced non-blocking optical switch is given in Table 3. The 4×4 GMZI state corresponds to the relevant row in Table 2, and is abbreviated by the first pair (i, k). In this configuration, the top left 2×2 GMZI is operated in the passive, cross-state, as in FIG. 3. The efficiency of this design approach, however, is obtained at the expense of driving the fourth 2×2 GMZI switch. Because only three of the four possible 4×4 GMZI 5f states are used, all four 2×2 GMZIs 5h must now be capable of active operation.

From the above description, it is appreciated that a balanced non-blocking optical switch results when a passive 2×2 GMZI 5h is replaced by a device that attenuates light entering or exiting ports to substantially the same extent as the passive 2×2 GMZI 5h. A similar attenuation of beam power is found for a beam passing through a specific attenuator as that for a beam passing through the 2×2 GMZI 5h.

As detailed above, when considering the balanced 4×4 non-blocking optical switch 50 comprising the 4×4 GMZI 5f a number of possible configurations exist. A first configuration is one in which all four waveguide arms 26 of the 4×4 GMZI have a means for changing their optical length and the 4×4 GMZI is optically coupled to four 2×2 GMZIs. Optionally, one of the 2×2 GMZIs is passive, i.e., crossstate, and all possible switching states are obtainable. Alternatively, one of the 2×2 GMZIs has no means for changing optical path length of connecting waveguide arms 26 between two MMIs that make up the 2×2 GMZI. In another embodiment one of the 2×2 GMZIs is replaced by a medium or any device that attenuates a light beam to substantially the same degree as a beam passing through the 2×2 GMZI.

Figure 4:
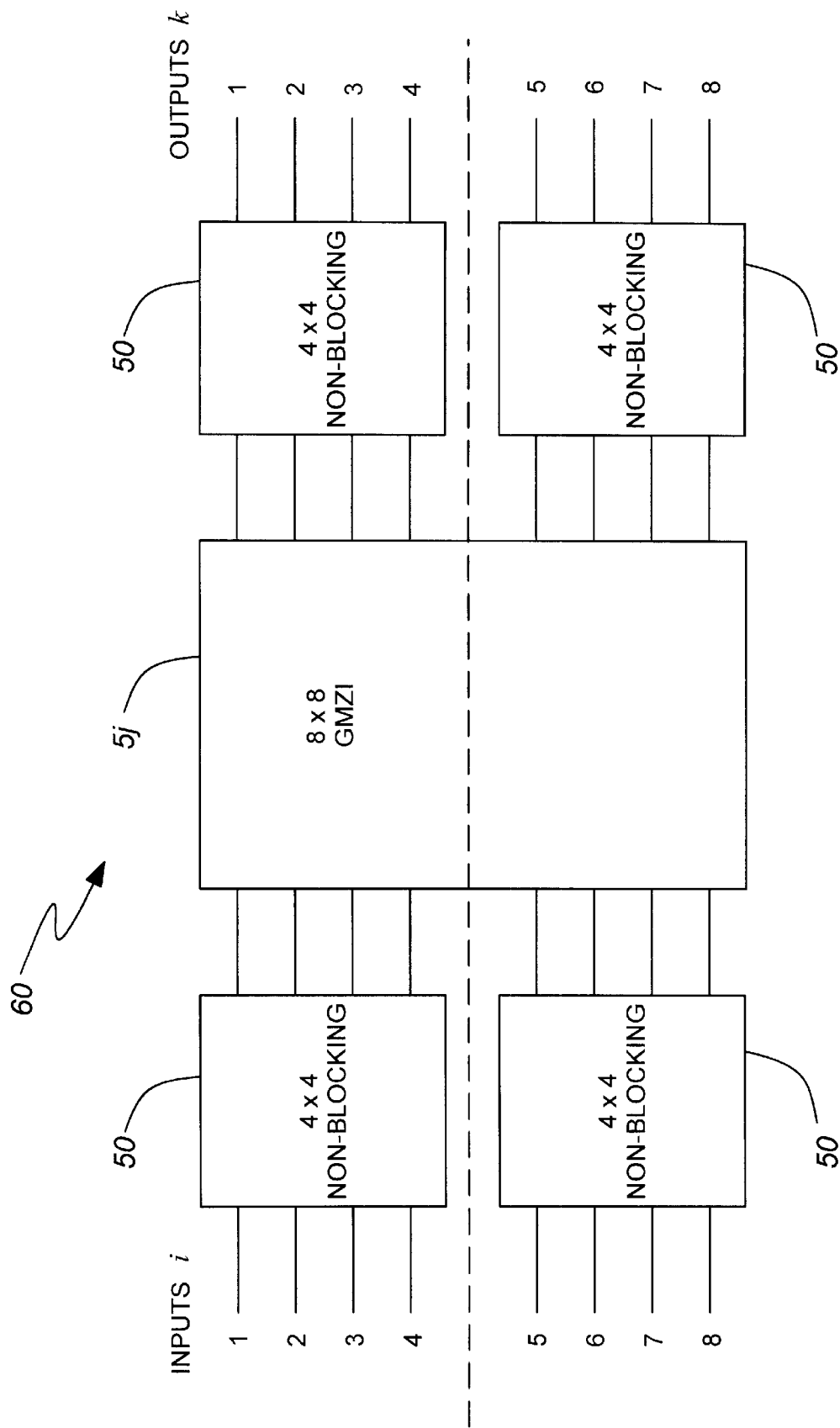
FIG. 4 is a schematic illustration of an 8×8 balanced non-blocking optical switch. A horizontal line bisecting the 8×8 GMZI is used to ensure that every possible number of crossovers from one side of this line to the other in the 8×8 GMZI is achieved within the eight available GMZI states. Once this line is drawn, smaller non-blocking optical switches are used to connect ports on both sides of the line.

In a similar manner, the design of balanced non-blocking optical switches is possible for larger values of N, where N is even. A bisection line is drawn in the cross-connect table of the N×N GMZI. The cross-connect capability of the N×N GMZI ensures that every possible number of crossovers is achievable within the N states. The N×N balanced non-blocking optical switch is formed by connecting the ports on a given side of the bisection line to a smaller non-blocking optical switch. In general, the smaller non-blocking optical switches are operated actively. As an example of a balanced optical switch configuration for larger N, referring to FIG. 4, the basic layout of a balanced 8×8 non-blocking optical switch 60 is formed from an 8×8 GMZI 5j and four 4×4 non-blocking optical switches 50. The 8×8 GMZI 5j is constructed in a similar manner as described in FIG. 1, however, waveguide arms 26 and phase shifters 28 are not shown. The 4×4 non-blocking optical switches 50 are constructed in a similar manner as described in FIG. 3. The 8×8 GMZI 5j and the four 4×4 non-blocking optical switches 50 are shown as rectangular boxes with input ports 4 and output ports 6. The 8×8 non-blocking optical switch 60 is constructed in a similar manner to the non-blocking optical switch described in FIG. 3. In Table 4 cross-connects for the 8×8 GMZI 5j are given. Table 4 provides the set of crossconnects (i, k) for the 8×8 GMZI 5f in which a given state of the 8×8 GMZI corresponds to a single row. The set of all possible crossovers about a line that divides the device into two regions (shown dashed) is obtained within the eight GMZI states. Hence, non-blocking operation is possible using the 8×8 GMZI. The input ports and the output ports are bisected as indicated by the shading, and the number of crossovers for each state are counted. Since the ports are divided into groups of four, it is possible to connect balanced 4×4 non-blocking optical switches to both sides of the 8×8 GMZI to obtain the necessary light routing permutations for the 8×8 balanced non-blocking optical switch.

It is possible to write a software program to determine the GMZI states needed to achieve a desired output permutation. Configuration of the GMZIs follows the procedure used in the 4×4 balanced non-blocking optical switch. The program first determines which of the GMZI states yields the number of crossovers indicated by the desired output permutation. Once these states are determined, the configuration tables of the smaller non-blocking optical switches are used to arrive at the desired permutations. Optionally, the software program optimizes the switch to eliminate unnecessary phase shifters and to minimise required power for driving the phase shifters where possible. As mentioned previously, the configuration states are not unique, and it may be possible to operate a number of the smaller component GMZIs in a passive mode.

From the above described switches, it is evident that by optically coupling two GMZIs in series, a greater switching capacity is obtained over an isolated GMZI. Numerous other embodiments may be envisaged without departing from the spirit and scope of the invention.

TABLE 1

| Light Routing Permutations | 3 × 3 GMZI States |
| --- | --- |
| 1 2 3 | |
| 1 3 2 | 1 3 2 |
| 2 1 3 | 2 1 3 |
| 2 3 1 | |
| 3 1 2 | |
| 3 2 1 | 3 2 1 |

TABLE 2

| 4 × 4 GMZI Switch States | | | | Crossover |
|---|---|---|---|---|
| (1,1) | (2,3) | (3,2) | (4,4) | 1 |
| (1,2) | (2,1) | (3,4) | (4,3) | 0 |
| (1,3) | (2,4) | (3,1) | (4,2) | 2 |
| (1,4) | (2,2) | (3,3) | (4,1) | 1 |

TABLE 3

| Light Routing Permutation | 4 × 4 GMZI States | 2 × 2 GMZI States | | |
|---|---|---|---|---|
| | | Lower Left | Top Right | Lower Right |
| 1 2 3 4 | (1,2) | CROSS | BAR | BAR |
| 1 2 4 3 | (1,2) | BAR | BAR | BAR |
| 1 3 2 4 | (1,4) | CROSS | CROSS | CROSS |
| 1 3 4 2 | (1,4) | CROSS | CROSS | BAR |
| 1 4 2 3 | (1,4) | BAR | CROSS | CROSS |
| 1 4 3 2 | (1,4) | BAR | CROSS | BAR |
| 2 1 3 4 | (1,2) | BAR | CROSS | CROSS |
| 2 1 4 3 | (1,2) | CROSS | CROSS | CROSS |
| 2 3 1 4 | (1,1) | BAR | BAR | BAR |
| 2 3 4 1 | (1,1) | BAR | BAR | CROSS |
| 2 4 1 3 | (1,1) | CROSS | BAR | BAR |
| 2 4 3 1 | (1,1) | CROSS | BAR | CROSS |
| 3 1 2 4 | (1,4) | CROSS | BAR | CROSS |
| 3 1 4 2 | (1,4) | CROSS | BAR | BAR |
| 3 2 1 4 | (1,1) | BAR | CROSS | BAR |
| 3 2 4 1 | (1,1) | BAR | CROSS | CROSS |
| 3 4 1 2 | (1,3) | CROSS | CROSS | CROSS |
| 3 4 2 1 | (1,3) | CROSS | CROSS | BAR |
| 4 1 2 3 | (1,4) | BAR | BAR | CROSS |
| 4 1 3 2 | (1,4) | CROSS | BAR | BAR |
| 4 2 1 3 | (1,1) | CROSS | CROSS | BAR |
| 4 2 3 1 | (1,1) | CROSS | CROSS | CROSS |
| 4 3 1 2 | (1,3) | CROSS | BAR | CROSS |
| 4 3 2 1 | (1,3) | CROSS | BAR | BAR |

TABLE 4

| 8 × 8 GMZI Switch States | | | | | | | | Crossover |
|---|---|---|---|---|---|---|---|---|
| (1,1) | (2,3) | (3,2) | (4,5) | (5,4) | (6,7) | (7,6) | (8,8) | 1 |
| (1,2) | (2,1) | (3,4) | (4,3) | (5,6) | (6,5) | (7,8) | (8,7) | 0 |
| (1,3) | (2,5) | (3,1) | (4,7) | (5,2) | (6,8) | (7,4) | (8,6) | 2 |
| (1,4) | (2,2) | (3,6) | (4,1) | (5,8) | (6,3) | (7,7) | (8,5) | 1 |
| (1,5) | (2,7) | (3,3) | (4,8) | (5,1) | (6,6) | (7,2) | (8,4) | 3 |
| (1,6) | (2,4) | (3,8) | (4,2) | (5,7) | (6,1) | (7,5) | (8,3) | 2 |
| (1,7) | (2,8) | (3,5) | (4,6) | (5,3) | (6,4) | (7,1) | (8,2) | 4 |
| (1,8) | (2,6) | (3,7) | (4,4) | (5,5) | (6,2) | (7,3) | (8,1) | 3 |

What is claimed is:

1. An optical switch comprising:
   an integrated optical N×N Mach-Zehnder interferometer, N being greater than 2, the integrated optical Mach-Zehnder interferometer comprising a first N×N multimode interference coupler having N first ports and N second waveguides, and a second N×N multimode interference coupler having N first waveguides and N second ports, wherein N second waveguides of the first N×N multimode interference coupler are optically coupled with N first waveguides of the second N×N multimode interference coupler thereby forming N waveguide arms;
   optical path length changers for changing an optical path length of at least 2 of the N waveguide arms; and
   a P×P optical switch having P second ports and P first ports, P being at least 2 and less than N, at least 2 of the P second ports optically coupled to at least 2 of the N first ports.

2. An optical switch according to claim 1, wherein N is greater than 3 and comprising a U×U optical switch having U second ports and U first ports, U being at least 2 and less than N, at least 2 of the U second ports optically coupled to at least 2 of the N first ports.

3. An optical switch according to claim 2, comprising a T×T optical switch having T second ports and T first ports, T being at least 2 and less than N, and at least 2 of the T first ports being optically coupled to at least 2 of the N second ports.

4. An optical switch according to claim 3, comprising a Z×Z optical switch having Z second ports and Z first ports, Z being at least 2 and less than N, at least 2 of the Z first ports optically coupled to at least 2 of the N second ports.

5. An optical switch according to claim 3, comprising an attenuator for reducing light intensity of a beam of light routed through Z of N second ports, Z being at least 2, for providing substantially same attenuation as provided by the T×T optical switch, and optical path length changers for changing the optical path length of each of the N waveguide arms.

6. An optical switch according to claim 2, wherein P+U=N.

7. An optical switch according to claim 4, wherein P+U=N=Z+T.

8. An optical switch according to claim 5, wherein P+U=N=Z+T.

9. An optical switch according to claim 8, wherein N is selected from 4, 6, 8, 10 and 12.

10. An optical switch according to claim 3, wherein the P×P optical switch is a non-blocking optical switch, the U×U optical is a non-blocking optical switch, and the T×T optical switch is a non-blocking optical switch.

11. An optical switch according to claim 3, wherein the optical path length changers comprise (N−1) individual optical path length changers, each for changing the optical path length of a waveguide arm.

12. An optical switch according to claim 1, comprising a T×T optical switch having T second ports and T first ports, T being at least 2 and less than N, and at least 2 of the T first ports being optically coupled to at least 2 of the N second ports.

13. An optical switch according to claim 1, comprising a controller for monitoring intensity of a beam of light emerging from a port of the optical switch and for providing a signal to the optical path length changers, wherein the optical path length changers are for changing the optical path length of at least one waveguide arm of the N waveguide arms for maintaining a switch state in dependence upon the signal.

14. An optical switch according to claim 1, wherein the P×P optical switch comprises an (N−1)×(N−1) non-blocking optical switch having (N−1) first ports and (N−1) second ports, the (N−1) second ports of the (N−1)×(N−1) non-blocking optical switch optically coupled to (N−1) of the N first ports of the integrated optical N×N generalized Mach-Zehnder interferometer.

15. An optical switch according to claim 14, wherein the (N−1)×(N−1) non-blocking optical switch comprises N−2 GMZIs each having a different number of waveguide arms, the number of waveguide arms from 2 to N−1, the N−2 GMZI's arranged in descending order of number of waveguide arms, such that each GMZI other than a terminal GMZI with 2 waveguide arms and an initial GMZI with N−1 waveguide arms is disposed between two GMZI's, one with one more waveguide arm and one with one less waveguide arm, each GMZI having a single free second port and each port other than the free second port within a GMZI optically coupled to one and only one port of an adjacent GMZI.

16. An optical switch according to claim 15, comprising an attenuator for reducing light intensity of light emerging from at least one of the free ports.

17. An optical switch according to claim 15, comprising an attenuator for reducing light intensity of light emerging from a port of the integrated optical N×N generalized Mach-Zehnder interferometer other than a port optically coupled to the (N−1)×(N−1) non-blocking optical switch.

18. An optical switch comprising:
  a splitting region for splitting input light into N sub-beams, the splitting region having N first ports;
  a combining region having N second ports, the combining region for combining the N sub-beams and for providing the combined sub-beams to at least one of the N second ports;
  N waveguide arms coupling the splitting region to the combining region for providing the N sub-beams from the splitting region to the combining region, where N is even and greater than 3;
  optical path length changers for changing an optical path length of at least (N−1) of the N waveguide arms;
  a P×P non-blocking optical switch having P second ports and P first ports, P is at least 2 and less than N, and at least 2 of the P second ports optically coupled to at least 2 of the N first ports;
  a U×U non-blocking optical switch having U second ports and U first ports, U being N−P, at least 2 of the U second ports optically coupled to at least 2 of the N first;
  a T×T non-blocking optical switch having T second ports and T first ports, T is at least 2 and less than N, and at least 2 of the T first ports being optically coupled to at least 2 of the N second ports; and
  a controller for monitoring intensity of a beam of light emerging from a port of the optical switch and for providing a signal to the optical path length changers, wherein the optical path length changers are for changing the optical path length of at least one waveguide arm of the internal waveguide arms in dependence upon the signal, the change for maintaining a switch state.

19. A method of extending an (N−1)×(N−1) non-blocking optical switch which comprises a step of optically coupling N−1 second ports of an integrated optical N×N Mach-Zehnder interferometer to N−1 first ports of the (N−1)×(N−1) non-blocking optical switch.

20. A method of extending an (N−1)×(N−1) non-blocking optical switch, according to claim 19, comprising a step of attenuating light emerging from at least one port of the N×N Mach-Zehnder interferometer other than light emerging from a port coupled to the (N−1)×(N−1) non-blocking optical switch.

21. A method of extending an (N−1)×(N−1) non-blocking optical switch, according to claim 19, comprising a step of providing a controller for monitoring intensity of a beam of light emerging from the optical switch and for providing a signal to the controller, wherein the controller is for changing the optical path length of at least one waveguide arm of the integrated optical N×N Mach-Zehnder interferometer in dependence upon the signal, the change for maintaining a switch state.

22. A method of extending an (N−1)×(N−1) non-blocking optical switch, according to claim 19, comprising a step of providing a controller for monitoring intensity of a beam of light emerging from the optical switch and for providing a signal to the controller, wherein the controller is for changing an optical path length of at least one waveguide arm of the (N−1)×(N−1) non-blocking optical switch in dependence upon the signal, the change for maintaining a switch state.

23. An optical switch according to claim 1, comprising (N−1) GMZIs optically coupled in a series, input ports of a GMZI in the series coupled to output ports of another GMZI, the integrated optical N×N GMZI being one of the (N−1) GMZIs, and the P×P optical switch being one of the (N−1) GMZIs, the GMZIs in the series each having a different number of waveguide arms, the number of waveguide arms from 2 to N.

24. An optical switch according to claim 23, wherein the series of GMZIs is ordered to provide a non-blocking optical switch.

* * * * *

UNITED STATES PATENT AND TRADEMARK OFFICE
CERTIFICATE OF CORRECTION

PATENT NO. : 6,292,597 B1
DATED : September 18, 2001
INVENTOR(S) : Lagali et al.

It is certified that error appears in the above-identified patent and that said Letters Patent is hereby corrected as shown below:

Column 2,
Line 63, "killed" should read -- skilled --

Column 10,
Right column, bottom "213" should read -- 321 --

Column 13,
Line 52, (first) ports omitted

Signed and Sealed this

Twenty-first Day of May, 2002

Attest:

Attesting Officer

JAMES E. ROGAN
Director of the United States Patent and Trademark Office